March 10, 1970 S. LACROIX 3,500,344

SUPERCONDUCTOR DATA STORAGE DEVICE

Filed June 27, 1966 5 Sheets-Sheet 1

Inventor:
Serge Lacroix
BY Baldwin, Wight, Diller & Brown
Attorneys

Inventor:
Serge Lacroix
BY Baldwin, Wight, Diller & Brown
Attorneys

Inventor:
Serge Lacroix
BY Baldwin, Wight, Diller & Brown
Attorneys

Inventor:
Serge Lacroix
BY Baldwin, Wight, Diller & Brown
Attorneys

Inventor:
Serge Lacroix
By Baldwin, Wight, Diller & Brown
Attorneys

United States Patent Office 3,500,344

Patented Mar. 10, 1970

3,500,344

SUPERCONDUCTOR DATA STORAGE DEVICE

Serge Lacroix, Champigny-sur-Marne, France, assignor to Société Industrielle Bull-General Electric, Société Anonyme, Paris, France Filed June 27, 1966, Ser. No. 560,552

Claims priority, application France, July 29, 1965, 26,511

Int. Cl. G11c *11/44*

U.S. Cl. 340—173.1 3 Claims

ABSTRACT OF THE DISCLOSURE

In order to increase the operating reliability of a data storage device in which a datum is written in the form of persistent currents in predetermined zones of a sheet of superconductive material under the action of coincident control currents, the thickness or composition of said sheet in any area thereof in which a return to the resistive state might disturb the operation of the device is so chosen that the critical current density of said area is superior to the critical current density of said zones.

Figure 1:
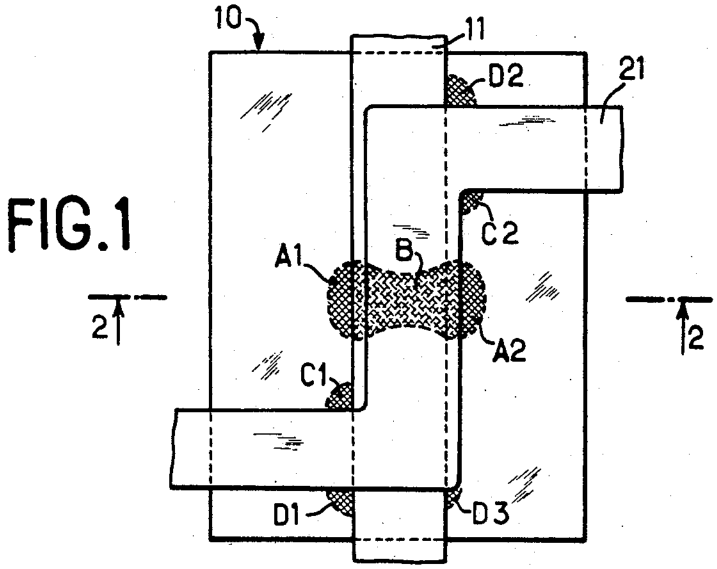

This invention relates to data storage devices in which the data are written in the form of persistent currents in a superconducting film.

The invention concerns more particularly devices of this type which comprise storage elements disposed in matrix form and in which the selection of a storage element is effected by means of control currents applied coincidentally along the storage element.

When currents are applied to control conductors disposed along the superconducting film, induced currents of opposite direction are set up on the surface of the latter, and when the density of the currents induced in the superconducting film locally reaches a certain critical value, a small zone of this film changes to the resistive state at the place in question.

The formation of resistive zones results in a local dissipation of energy and a modification of the state of equilibrium of the currents induced in the superconducting film.

The characteristic phenomena of the writing and reading of data in devices of the type under consideration result from the creation of such resistive zones in well-defined regions of the superconducting film, and it has been discovered that certain disturbances which are likely to result in the loss of written data are due to the appearance of resistive zones in certain other regions of the superconducting film which are separate from the first.

Now, the critical current density, i.e. the value of the current density from which resistive zones are formed in the superconducting film at the operating temperature of the device, depends upon the nature of the superconducting film and upon its thickness.

In known storage devices of the type under consideration, the superconducting film is of constant nature and of constant thickness.

A superconducting-film storage device according to the invention is characterised in that the nature and the thickness of the superconducting film, in a region of the latter in which a return to the resistive state would be likely to disturb the operation of the device, are so chosen that the critical current density in this region is sufficiently high to avoid such a transition during the operation of the device.

In order that such a transition may be obviated, it is necessary for the critical density in this region to be higher than the maximum value of the current density reached in this region when control currents pass through the control conductors of the device.

In order to provide a superconducting film having, in the region under consideration, a sufficiently high critical density and in particular a higher critical density than the regions in which the formation of resistive zones is necessary for the operation of the device, various means may be employed, more particularly the formation on the region under consideration of an additional thickness of the same substance as the remainder of the superconducting film, or of a different substance, or the local introduction of an appropriate substance with or without increased thickness by diffusion or local insertion.

The invention may with advantage be applied to storage matrices comprising a continuous superconducting film which is common to all the storage elements. In this application, it permits of limiting the reciprocal actions between neighbouring storage elements.

Figure 2:
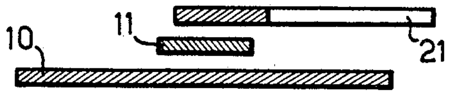
Figure 11:
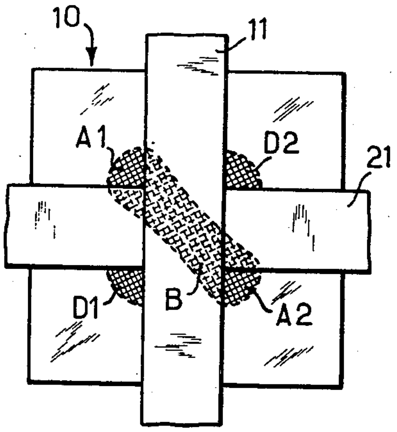
Figure 12:
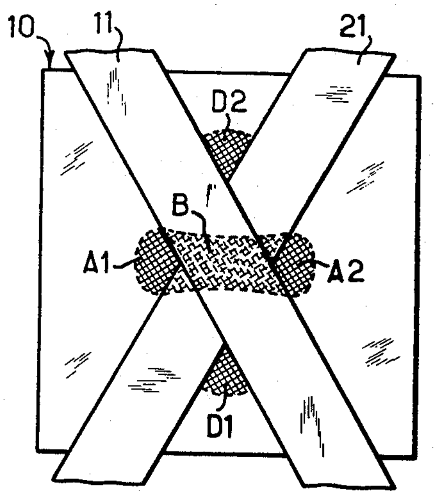
Figure 13:
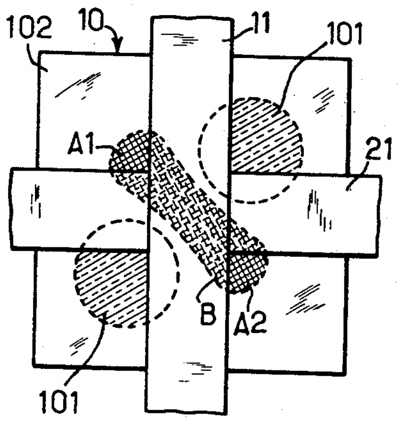
Figure 14:
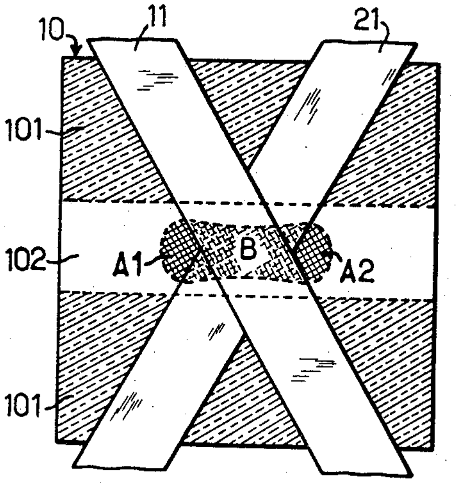

For a better understanding of the invention and to show how it may be carried into effect, the same will now be described, by way of example, with reference to the accompanying drawings, in which:

FIGURE 1 is a plan view of a persistent-current storage element of a first type to which the present invention is applicable, FIGURE 2 is a section along 2—2 of FIGURE 1, FIGURES 3 to 10 are plan and sectional views of various storage elements according to the invention of the same type as that illustrated in FIGURES 1 and 2, FIGURES 11 and 12 are plan views of storage elements of a second type to which the invention is applicable, FIGURES 13 and 14 are plan views of storage elements according to the invention of the same type as those illustrated in FIGURES 11 and 12, and FIGURES 15 and 16 are plan views of storage matrices according to the invention.

The storage element illustrated in FIGURES 1 and 2 comprises a continuous sheet 10 of a superconducting substance having a weak critical field, such as tin or indium. This sheet is referred to by the expression "superconducting film" in the remainder of the description. The storage element comprises in addition control conductors 11 and 21 in ribbon form which are disposed on one of the faces of the superconducting film 10. These conductors are made of a superconducting substance, such as lead, which has a relatively high critical field.

In FIGURE 1, the cross-hatched areas A1, A2, B, C1, C2, D1, D2 and D3 represent zones of the superconducting film 10 which become resistive or which are capable of becoming resistive, during the operation of the storage element.

A binary datum element is represented in the storage element in the form of persistent currents flowing in a particular direction through the superconducting film 10 around the resistive zones A1 and A2, each of which extends from one face of the superconducting film to the other, and through which there exists a magnetic flux due to the said persistent currents.

The reversal of the direction of the persistent currents for the purpose of substituting one of the binary digits for the other in the storage element assumes the momentary appearance, between the resistive zones A1 and A2, of an intermediate resistive zone B which merges the two zones A1 and A2 into one.

During the operation of the storage element just described, regardless of whether this is during the passage of a current of normal value through each of the control conductors for controlling the storage element, or during the passage of a current having this same normal value through only one of these control conductors, resistive zones may appear in regions of the superconducting film which are separate from those in which the zones A1, A2 and B are situated. This is the case, for example, with the zones C1, C2, D1 and D2 which are situated along angles formed by the edges of the control conductors 11 and 21. The appearance of such zones is likely to cause disturbances in the operation of the storage element.

In the storage elements according to the invention, the superconducting film constituting the writing medium is made such that, in those regions of this superconducting film whose return to the resistive state must be avoided during the operation of the storage element, the critical current density is higher than the maximum current density which can be reached in this region during the passage of a control current through either one of the control conductors or through both simultaneously.

This result may be achieved by various means.

In the figures accompanying the present specification, the areas hatched with chain lines represent regions of the superconducting film in which the critical density satisfies the aforesaid condition.

FIGURES 3 to 10 illustrate, as non-limiting examples, various constructional forms of superconductor storage elements embodying the present invention.

Figure 3:
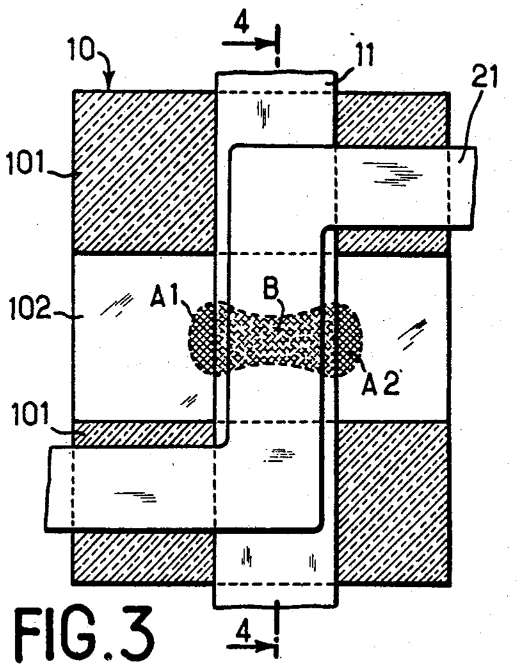
Figure 4:
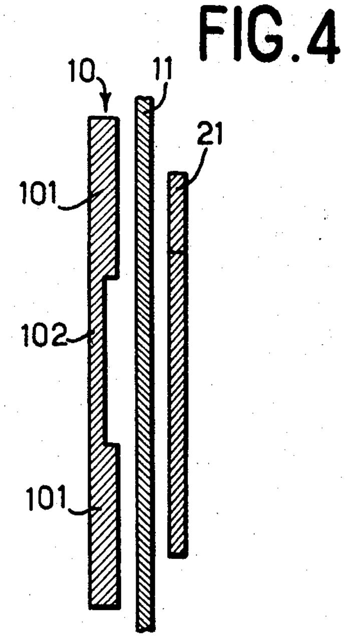

The regions 101 of the superconducting film 10 of the storage element illustrated in FIGURES 3 and 4 are thicker than the region 102 of this film, so that the critical density is higher in the regions 101 than in the region 102.

The critical density of the superconducting film in the region 101 is thus brought to a value higher than the maximum value which can be reached by the current density in this region, during the passage of a control current through either one of the control conductors 11 and 21 or through both simultaneously.

The formation of resistive zones in the region 101 of the superconducting film 10 during the operation of the storage element is thus avoided.

The cross-hatched areas A1, A2 and B of FIGURE 3 then represent the only resistive zones which are formed in the superconducting film in the course of the operation of the storage element. These zones are situated in the region 102 of the superconducting film, and they are formed in the same way as in the storage element illustrated in FIGURE 1.

Although the additional thicknesses of the super-conducting film 10 of the storage element illustrated in FIGURES 3 and 4 are situated on that face of the said film which is on the same side as the control conductors 11 and 21, it is to be noted that storage elements according to the invention may be provided by disposing these additional thicknesses on the opposite face of the superconducting film.

Figure 5:
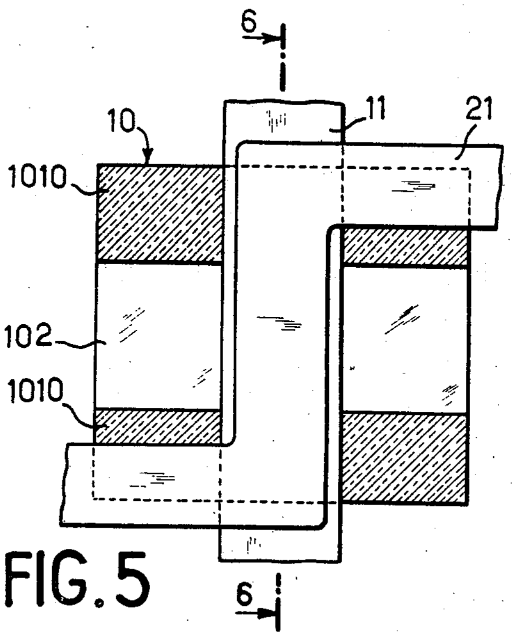
Figure 6:
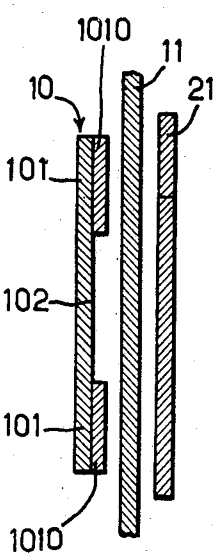

In the regions 101 of the superconduction film 10 of the storage element illustrated in FIGURES 5 and 6, superconducting films 1010 are superimposed on the superconducting film 10. Any superconducting substance which is capable of satisfying the conditions for the construction of the storage element may be employed to form these superimposed superconducting films 1010.

Although in the storage element illustrated in FIGURES 5 and 6 the superimposed superconducting films 1010 are disposed on that face of the said film which is on the same side as the control conductors 11 and 21, it is to be noted that storage elements according to the invention may be produced by providing superimposed super-conducting films on the opposite face of the superconducting film.

Figure 7:
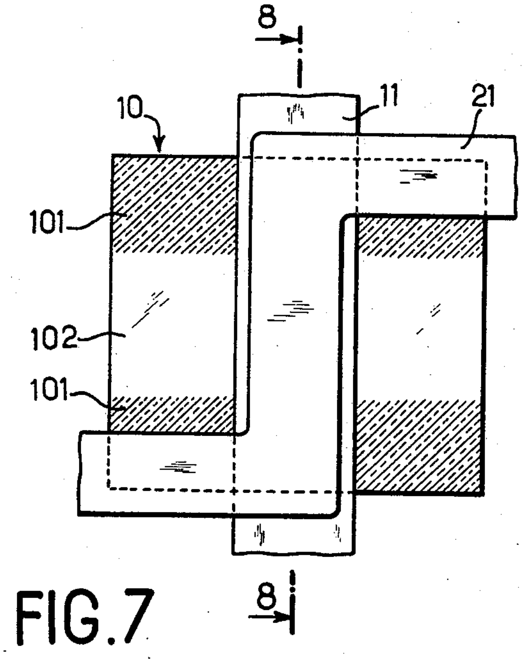
Figure 8:
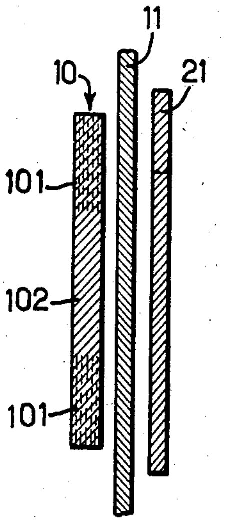

The composition of the regions 101 of the superconducting film 10 of the storage element illustrated in FIGURES 7 and 8 is different from that of the region 102 of the said film. The composition of each of these regions is so chosen that the critical density therein has the desired value. This may be effected by local diffusion of appropriate substance in the superconducting film.

Figure 9:
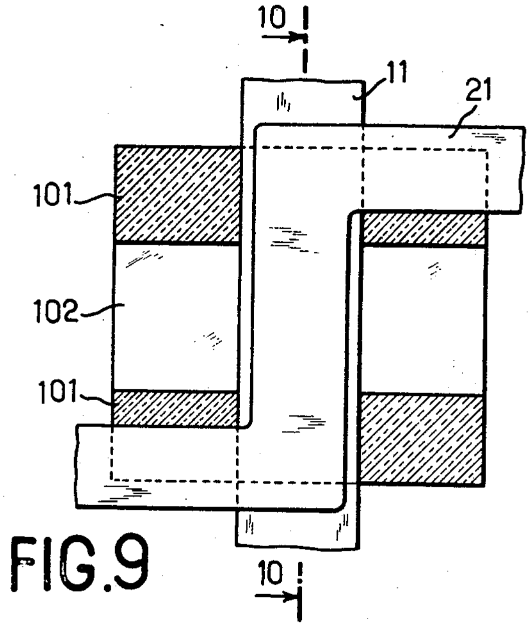
Figure 10:
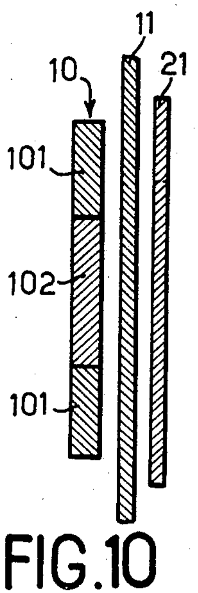

In the storage element illustrated in FIGURES 9 and 10, the superconducting film 10 is formed of separate elements consisting of different substances and forming the regions 101 and 102 respectively.

In the foregoing, it has been explained with reference to FIGURE 3 to 10 how the invention may be applied to storage elements of the type illustrated in FIGURES 1 and 2, and various means which may be employed in this application to obtain the desired critical density in the chosen regions of the superconducting film have been indicated. It is obvious that the invention is also applicable with advantage to storage elements of different types, for example to the storage elements illustrated in FIGURES 11 and 12. In the latter storage elements, the establishment of the persistent currents representing data necessitates the formation of resistive zones A1, A2 and B in the superconducting film 10, while disturbances may result from the return of the zones D1 and D2 to the resistive state.

FIGURES 13 and 14 illustrate storage elements of the type illustrated in FIGURES 11 and 12 respectively, embodying the present invention.

In these storage elements, the superconducting film 10 is so constructed that the critical current density in the regions 101 represented in FIGURES 13 and 14 by areas hatched with chain lines is higher than the maximum current density which can be reached in these regions during the passage of a control current through either one of the control conductors or through both simultaneously.

The various means indicated in the foregoing make it possible to provide a superconducting film having such regions.

Storage elements having the features set forth in the foregoing may be employed in the construction of the storage matrices according to the invention.

Figure 16:
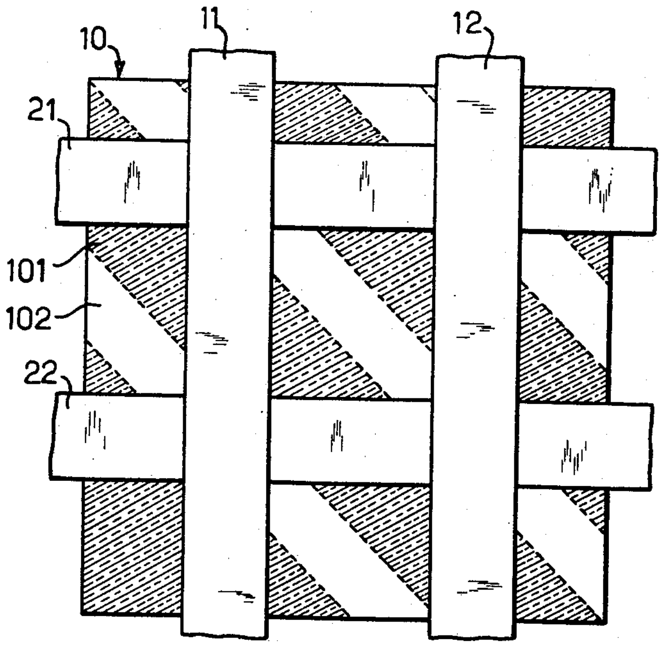
Figure 15:
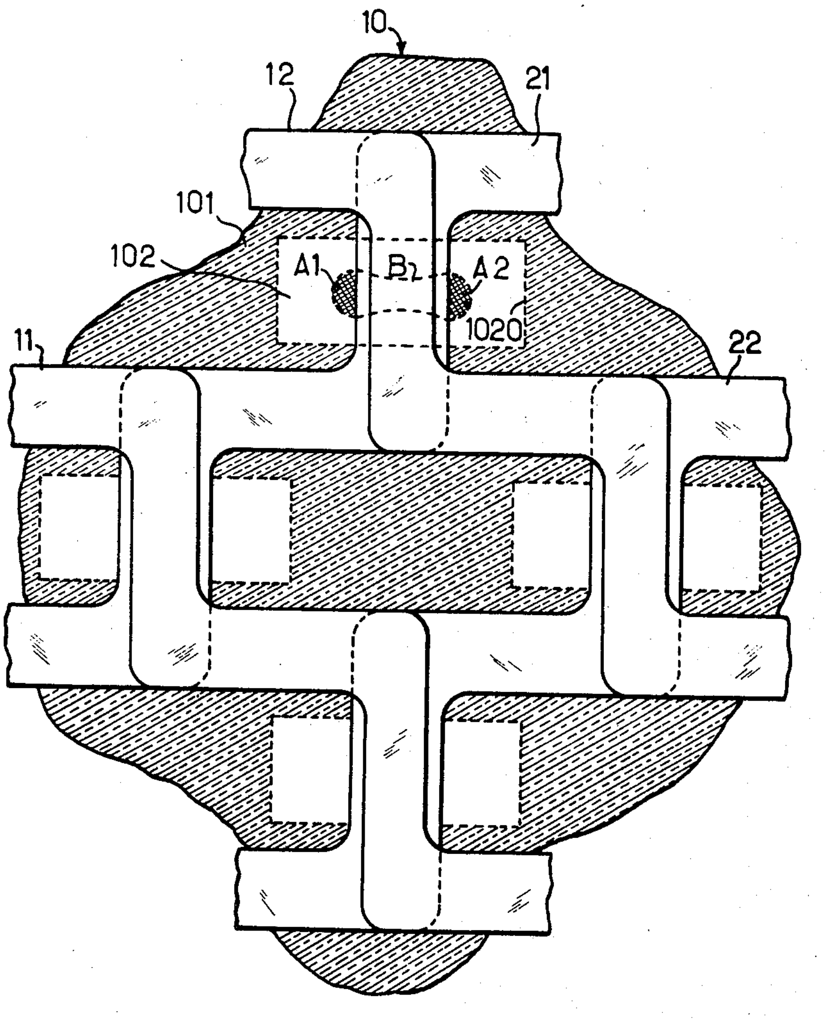

FIGURES 15 and 16 illustrate by way of example storage matrices according to the invention in which the writing medium is a superconducting film 10 common to all the storage elements, and in which the control conductors 11, 12, 21 and 22 have a configuration such that they provide with the superconducting film 10 storage elements according to the invention of one of the previously described types. The storage elements of the storage matrix illustrated in FIGURE 15 are of the type illustrated in FIGURES 3 to 10, and those of the matrix illustrated in FIGURE 16 are of the type illustrated in FIGURE 13.

In these storage matrices, the superconducting film 10 is so constructed that the critical current density in the regions 101, represented in FIGURES 15 and 16 by areas hatched with chain lines, is higher than the maximum current density which can be reached in these regions during the operation of the said storage matrices.

In the superconducting film 10 of the storage matrix illustrated in FIGURE 15, the region 102 comprising the resistive zones A1, A2 and B whose formation permits the writing and reading of data in a storage element of the matrix is entirely surrounded by a region 101 in which the critical density satisfies the aforesaid condition. It is possible by this arrangement to prevent reciprocal actions between the storage element under consideration and the neighbouring storage elements.

In addition, in the superconducting film 10 of the storage matrix illustrated in FIGURE 15, the edge 1020 of such a region 102 is sufficiently far from the zones A1, A2 and B for the characteristic phenomena of the writing and reading of data in the storage element under consideration to depend only upon the properties of the substance constituting the superconducting film in the region 102 under consideration and not upon the dimensions or the state of the edges of the said region. Thus, the small differences in shape and dimensions which may exist in the regions 102 of the superconducting film 10 have no effect on the phenomena under consideration.

In the superconducting film 10 of the storage matrix illustrated in FIGURE 16, the regions 102 corresponding to storage elements disposed on a common diagonal of the matrix form one and the same region, so that the regions 101 and 102 of the superconducting film 10 form parallel strips having readily obtainable constant widths.

It will be obvious that this arrangement may also be adopted for the storage matrix illustrated in FIGURE 15.

I claim:

1. A data storage device including at least one storage element, said element comprising a sheet of superconducting material, said sheet having a first area and a second area; and two control conductors in the form of ribbon-like strips of superconducting material, said control conductors having at least a portion of their length superimposed at different levels above said first area and being magnetically coupled to said first area; said first area having a characteristic critical current density which is lower than the maximum current density obtained in said first area by coincident control currents flowing through said control conductors; and said second area having a characteristic critical current density which is higher than that of said first area and higher than the maximum current density obtained in said second area by said control currents, whereby resistive zones are created in the first area under the action of flow of current and no resistive zone is created in the second area.

2. A data storage device including at least one storage element, said element comprising a sheet of superconducting material of constant composition, said sheet having a first area and a second area, the thickness of the sheet in said first area being smaller than the thickness of said sheet in said second area; and two control conductors in the form of ribbon-like strips of superconducting material, said control conductors having at least a portion of their length superimposed at different levels above said first area and being magnetically coupled to said first area; said first area having a characteristic critical current density which is lower than the maximum current density obtained in said first area by coincident control currents flowing through said control conductors, and said second area having a characteristic critical current density which is higher than the maximum current density obtained in said second area by said control currents, whereby resistive zones are created in the first area under the action of flow of current and no resistive zone is created in the second area.

3. A superconductor memory matrix comprising a sheet of superconducting material of constant composition, said sheet having a plurality of first and a plurality of second areas, and two sets of control conductors in the form of ribbon-like strips of superconducting material, said two sets of control conductors being respectively associated with the rows and the columns of the matrix, each control conductor of one set and each control conductor of the other set having a portion of their length superimposed at different levels above one of said first areas and being magnetically coupled to said first area, the thickness of the sheet in each first area being smaller than the thickness of said sheet in each second area, each first area having a characteristic critical current density which is lower than the maximum current density obtained in said first area by coincident control currents flowing through the respective two control conductors associated with said first area, each second area having a characteristic critical current density which is higher than the maximum current density obtained in said second area by said control currents, whereby resistive zones are created in each first area under the action of currents through the respective two control conductors associated respectively with each first area and no resistive zone is created in any one of said second areas.

References Cited

UNITED STATES PATENTS

| | | | |
|---|---|---|---|
| 2,981,933 | 4/1961 | Crowe et al. | 340—173.1 X |
| 3,172,086 | 3/1965 | Wendt | 340—173.1 |
| 3,234,439 | 2/1966 | Alphonse | 340—173.1 X |
| 3,283,282 | 11/1966 | Rosenberg | 340—173.1 X |

BERNARD KONICK, Primary Examiner

J. F. BREIMAYER, Assistant Examiner

U.S. Cl. X.R.

307—306